(12) United States Patent
Ueki

(10) Patent No.: US 11,959,756 B2
(45) Date of Patent: Apr. 16, 2024

(54) CONTROLLER AND VEHICLE CONTROL METHOD FOR SETTING PICK-UP AND DROP-OFF ZONES OF RIDE-SHARING VEHICLE

(71) Applicant: TOYOTA JIDOSHA KABUSHIKI KAISHA, Toyota (JP)

(72) Inventor: Nobukazu Ueki, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 17/744,119

(22) Filed: May 13, 2022

(65) Prior Publication Data

US 2022/0373340 A1    Nov. 24, 2022

(30) Foreign Application Priority Data

May 18, 2021   (JP) ................. 2021-083997

(51) Int. Cl.
   *G01C 21/34*   (2006.01)
   *G06Q 10/02*   (2012.01)
   *G06Q 50/30*   (2012.01)

(52) U.S. Cl.
   CPC ......... *G01C 21/3438* (2013.01); *G06Q 10/02* (2013.01); *G06Q 50/30* (2013.01)

(58) Field of Classification Search
   CPC .... G01C 21/3438; G06Q 10/02; G06Q 50/30; G06Q 10/047
   USPC .......................................................... 705/13
   See application file for complete search history.

(56) References Cited

U.S. PATENT DOCUMENTS

| | | | |
|---|---|---|---|
| 2020/0104770 A1* | 4/2020 | Aich ................ | G01C 21/3423 |
| 2020/0126419 A1 | 4/2020 | Yasui et al. | |
| 2021/0097452 A1 | 4/2021 | Niemiec et al. | |
| 2021/0223051 A1* | 7/2021 | Hochberg .......... | G06Q 10/0631 |

(Continued)

FOREIGN PATENT DOCUMENTS

| | | |
|---|---|---|
| JP | 2020-531337 A | 11/2020 |
| WO | 2019/040420 A1 | 2/2019 |

OTHER PUBLICATIONS

Di Caro, Martin; "Could Uber Be MetroAccess Alternative? Montgomery Co. Coalition Opposes Idea"; https://wamu.org/story/16/02/02/could_uber_be_a_metroaccess_alternative_montgomery_county_coalition_opposes_idea/; Feb. 2, 2016. (Year: 2016).*

(Continued)

*Primary Examiner* — Dione N. Simpson
(74) *Attorney, Agent, or Firm* — Dinsmore & Shohl LLP

(57) ABSTRACT

A controller includes a memory and a processor. The memory stores drop-off data regarding a first user who gets off a ride-sharing vehicle and pick-up data regarding a second user who gets on the ride-sharing vehicle. The processor is configured to execute vehicle control including at least one of drop-off of the first user and pick-up of the second user based on at least one of the drop-off data and the pick-up data. The vehicle control includes, executing at least one of first zone setting processing that is processing of setting a first zone where the drop-off is executed and second zone setting processing that is processing of setting a second zone where the pick-up is executed, and executing first zone resetting processing of resetting the first zone in a space not overlapping the second zone.

11 Claims, 10 Drawing Sheets

(56) References Cited

U.S. PATENT DOCUMENTS

2021/0272463 A1* 9/2021 Jia .......................... G06Q 50/30
2022/0221867 A1* 7/2022 Taveira ................ G05D 1/0214

OTHER PUBLICATIONS

U.S. Appl. No. 17/502,581, filed Oct. 15, 2021; Inventors: Nobukazu Ueki et al.

* cited by examiner

CONTROLLER AND VEHICLE CONTROL METHOD FOR SETTING PICK-UP AND DROP-OFF ZONES OF RIDE-SHARING VEHICLE

CROSS-REFERENCE TO RELATED APPLICATION

This application claims priority to Japanese Patent Application No. 2021-083997 filed on May 18, 2021, incorporated herein by reference in its entirety.

BACKGROUND

1. Technical Field

The present disclosure relates to a controller and a method for controlling a vehicle that provides a ride-sharing service.

2. Description of Related Art

Japanese Unexamined Patent Application Publication (Translation of PCT Application) No. 2020-531337 (JP 2020-531337 A) discloses a method for deciding a stop position of a vehicle that provides a pick-up service of a user. In the method, when a vehicle arrives around a destination, a set of candidates of the stop position is extracted. Based on information regarding a user who wants to get on a vehicle, a time needed for a user to get on the vehicle is estimated. Alternatively, based on information regarding a user who wants to get off a vehicle, a time needed for the user to get off the vehicle is estimated. The estimated time is compared with the set of extracted candidates. A specific candidate is selected as the stop position based on a result of the comparison.

SUMMARY

A vehicle (hereinafter, also referred to as a "ride-sharing vehicle") that provides a ride-sharing service is considered. In the ride-sharing service, it is assumed that, at the same time a first user gets off the ride-sharing vehicle, a second user gets on the ride-sharing vehicle. For this reason, the above method cannot be applied to a method of deciding a stop position of the ride-sharing vehicle directly. This is because the above method needs as a prerequisite a service based on on-demand pick-up of a user and does not assume pick-up of an unspecified large number of users.

When the drop-off of the first user and the pick-up of the second user by the ride-sharing vehicle are performed at the same position, a getting-off operation of a first user to get off the vehicle is likely to interfere with a getting-on operation of the second user. The interference of the getting-on and getting-off operations of the first and second users is undesirable because of causing degradation of the safety of the first and second users. When the getting-on operation is performed before the getting-off operation, the completion of the getting-off operation is likely to be delayed. Such a delay is undesirable because of causing degradation of the convenience of the ride-sharing service. Accordingly, it is desired to develop a new technique focusing on the safety of the user and the convenience of the ride-sharing service.

The present disclosure provides a technique capable of securing the safety of a first user who gets off a ride-sharing vehicle and the safety of a second user who gets on the ride-sharing vehicle to improve the convenience of a ride-sharing service.

A first aspect of the present disclosure relates to a controller for a ride-sharing vehicle.

The controller includes a memory and a processor. The memory stores drop-off data regarding a first user who gets off the ride-sharing vehicle and pick-up data regarding a second user who gets on the ride-sharing vehicle. The drop-off data includes data of a first scheduled position where drop-off is performed, and the pick-up data includes data of a second scheduled position where pick-up is performed. The processor is configured to execute vehicle control including at least one of the drop-off of the first user and the pick-up of the second user based on at least one of the drop-off data and the pick-up data.

The vehicle control includes executing at least one of first zone setting processing and second zone setting processing based on at least one of the first scheduled position and the second scheduled position. The first zone setting processing is processing of setting a first zone where the drop-off is executed, on a road in front of the ride-sharing vehicle. The second zone setting processing is processing of setting a second zone where the pick-up is executed, on the road in front of the ride-sharing vehicle.

The vehicle control includes determining whether or not the first zone and the second zone overlap when both the first zone setting processing and the second zone setting processing are executed.

The vehicle control includes setting, when determination is made that the first zone and the second zone do not overlap, a first target stop position of the ride-sharing vehicle within the first zone and setting a second target stop position of the ride-sharing vehicle within the second zone.

The vehicle control includes setting, when determination is made that the first zone and the second zone overlap, the second target stop position within the second zone, executing first zone resetting processing of resetting the first zone in a space not overlapping the second zone, and setting the first target stop position within the reset first zone.

In the first aspect of the present disclosure, the processor may be configured to execute the second zone setting processing when a second distance between a current position of the ride-sharing vehicle and the second scheduled position is shorter than a second threshold value.

The second zone setting processing may include setting, when there is a plurality of the second scheduled positions each having the second distance shorter than the second threshold value, a candidate of the second zone for each of the second scheduled positions, determining whether or not the candidates of the second zone include a nearest second zone candidate having the second distance that is shortest and a second alternative candidate that is another candidate overlapping the nearest second zone candidate, setting the nearest second zone candidate as the second zone when determination is made that the candidates of the second zone include the nearest second zone candidate alone, and combining, when determination is made that the candidates of the second zone include the nearest second zone candidate and the second alternative candidate, the nearest second zone candidate and the second alternative candidate to set the second zone.

In the first aspect of the present disclosure, the drop-off data may include data of an attribute of the first user.

The processor may be configured to execute the first zone setting processing when a first distance between a current position of the ride-sharing vehicle and the first scheduled position is shorter than a first threshold value.

The first zone setting processing may include setting, when there is a plurality of the first scheduled positions each having the first distance shorter than the first threshold value, a candidate of the first zone for each of the first scheduled positions, determining whether or not the candidates of the first zone include a nearest first zone candidate having the first distance that is shortest and a first alternative candidate that is another candidate overlapping the nearest first zone candidate, setting the nearest first zone candidate as the first zone when determination is made that the candidates of the first zone include the nearest first zone candidate alone, and setting, when determination is made that the candidates of the first zone include the nearest first zone candidate and the first alternative candidate, the first zone based on the data of the attribute included in the same drop-off data as the data of the first scheduled position used in the setting of the nearest first zone candidate and the first alternative candidate.

In the first aspect of the present disclosure, the ride-sharing vehicle may include a slope board configured to help drop-off of a vulnerable pedestrian.

The attribute includes a classification of the vulnerable pedestrian.

The first zone setting processing may include determining, when determination is made that the candidates of the first zone include the nearest first zone candidate and the first alternative candidate, whether or not the data of the attribute included in the same drop-off data as the data of the first scheduled position used in the setting of the nearest first zone candidate and the first alternative candidate includes data of the vulnerable pedestrian, and setting the first zone in a space where the slope board is expandable when determination is made that the data of the attribute includes the data of the vulnerable pedestrian.

In the first aspect of the present disclosure, the attribute may further include a classification of a quasi-vulnerable pedestrian.

The first zone setting processing may include determining whether or not the data of the attribute includes data of the quasi-vulnerable pedestrian when determination is made that the data of the attribute does not include the data of the vulnerable pedestrian, and setting the first zone in at least a flat space when determination is made that the data of the attribute includes the data of the quasi-vulnerable pedestrian.

In the first aspect of the present disclosure, the first zone resetting processing may include processing of resetting the first zone based on the data of the attribute included in the same drop-off data as the data of the first scheduled position used in the setting of the nearest first zone candidate or the first alternative candidate in the first zone setting processing.

In the first aspect of the present disclosure, the memory may further store driving environment data of the ride-sharing vehicle.

The attribute may include classifications of a vulnerable pedestrian and a quasi-vulnerable pedestrian.

The first zone resetting processing may include determining whether or not the data of the attribute included in the same drop-off data as the data of the first scheduled position used in the setting of the nearest first zone candidate or the first alternative candidate in the setting processing of the first zone includes data of the vulnerable pedestrian or the quasi-vulnerable pedestrian, and setting the first zone based on the driving environment data when determination is made that the data of the attribute does not include the data of the vulnerable pedestrian or the quasi-vulnerable pedestrian.

A second aspect of the present disclosure relates to a control method by a controller for a ride-sharing vehicle.

The controller includes a memory and a processor. The memory stores drop-off data regarding a first user who gets off the ride-sharing vehicle and pick-up data regarding a second user who gets on the ride-sharing vehicle. The drop-off data includes data of a first scheduled position where drop-off is performed, and the pick-up data includes data of a second scheduled position where pick-up is performed.

The processor is configured to execute vehicle control including at least one of the drop-off of the first user and the pick-up of the second user based on at least one of the drop-off data and the pick-up data.

The control method includes setting at least one of a first zone where the drop-off is executed and a second zone where the pick-up is executed, on a road in front of the ride-sharing vehicle based on at least one of the first scheduled position and the second scheduled positions, determining whether or not the first zone and the second zone overlap when both the first zone and the second zone are set, setting, when determination is made that the first zone and the second zone do not overlap, a first target stop position of the ride-sharing vehicle within the first zone and setting a second target stop position of the ride-sharing vehicle within the second zone, and setting, when determination is made that the first zone and the second zone overlap, the second target stop position within the second zone, resetting the first zone in a space not overlapping the second zone, and setting the first target stop position within the reset first zone.

According to the aspects of the present disclosure, when both the first zone and the second zone are set, determination is made whether or not the first zone and the second zone overlap. Then, when determination is made that the first zone and the second zone overlap, the first zone is reset in the space not overlapping the second zone. In a case where the first zone is set in the space not overlapping the second zone, the second zone and the first zone are separated in terms of position, and the getting-off operation and the getting-on operation are separated in terms of time. Accordingly, it is possible to secure the safety of the first and second users. It is also possible to suppress degradation of the convenience of the ride-sharing service.

According to the first aspect of the present disclosure, when the distance between the current position of the ride-sharing vehicle and the scheduled position of the pick-up is shorter than the threshold value, the processing of setting the second zone is performed. In the setting processing of the second zone, when there is a plurality of candidates of the second zone, determination is made whether or not there is another candidate overlapping the nearest candidate. Then, when determination is made that there is another candidate, the second zone is set by combining the candidate with the nearest candidate. Accordingly, when the second users are waiting in line for the ride-sharing vehicle, it is possible to set the first zone away from the line.

According to the first aspect of the present disclosure, when the distance between the current position of the ride-sharing vehicle and the scheduled position of the drop-off is shorter than the threshold value, the processing of setting the first zone is performed. In the setting processing of the first zone, when there is a plurality of candidates of the first zone, determination is made whether or not there is another candidate overlapping the nearest candidate. Then, when determination is made that there is another candidate, the first zone is set based on the data of the attributed included in the same drop-off data as the data of the scheduled position used in the setting of the candidates. For this reason, even when the attribute of the first user is classified into a large number of classifications, it is possible to set the first zone as appropriate.

According to the first aspect of the present disclosure, when the data of the attribute included in the same drop-off data as the data of the scheduled position used in the setting of the nearest candidate and another candidate includes the data of the vulnerable pedestrian, it is possible to set the first zone while giving priority to the vulnerable pedestrian.

According to the first aspect of the present disclosure, when the data of the attribute does not include the data of the vulnerable pedestrian and includes the data of the quasi-vulnerable pedestrian, it is possible to set the first zone while giving priority to the quasi-vulnerable pedestrian.

According to the first aspect of the present disclosure, in a case of resetting the first zone, it is possible to set the first zone based on the attribute of the first user as appropriate.

According to the first aspect of the present disclosure, in a case of resetting the first zone, when the first user does not correspond to the vulnerable pedestrian or the quasi-vulnerable pedestrian, that is, when the first user corresponds to a normal pedestrian, it is possible to set the first zone based on the driving environment data. Accordingly, it is possible to compensate degradation of the convenience of the first user who suffers a disadvantage due to the resetting of the first zone.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
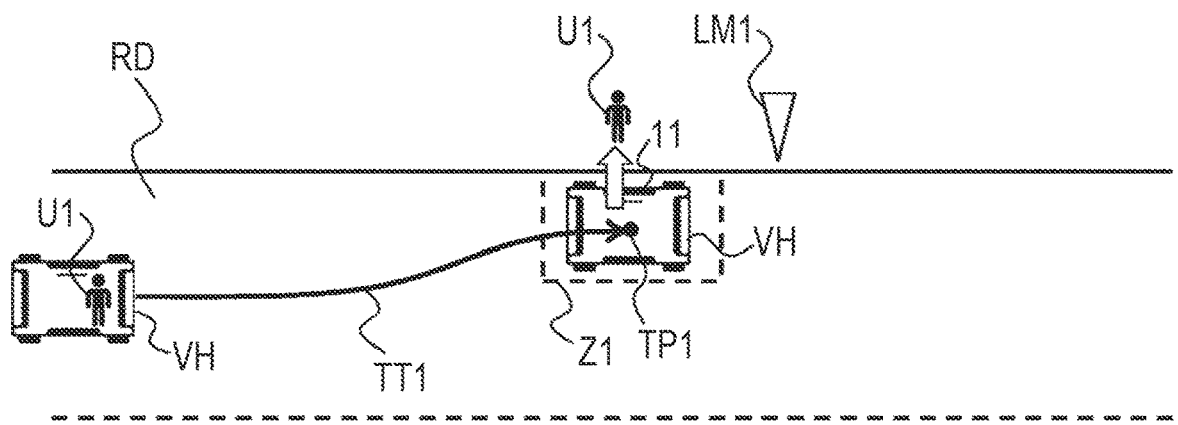
FIG. 1 is a diagram illustrating the outline of a ride-sharing service (drop-off)

Hereinafter, a controller (hereinafter, simply referred to as a "controller") for a ride-sharing vehicle according to an embodiment of the present disclosure will be described referring to the drawings. A control method for a ride-sharing vehicle according to the embodiment is realized by computer processing that is performed in the controller according to the embodiment. In the drawings, the same or corresponding portions are represented by the same reference numerals and description thereof will be simplified or will not be repeated.

1. Outline of Embodiment 1-1. Ride-Sharing Service

Figure 2:
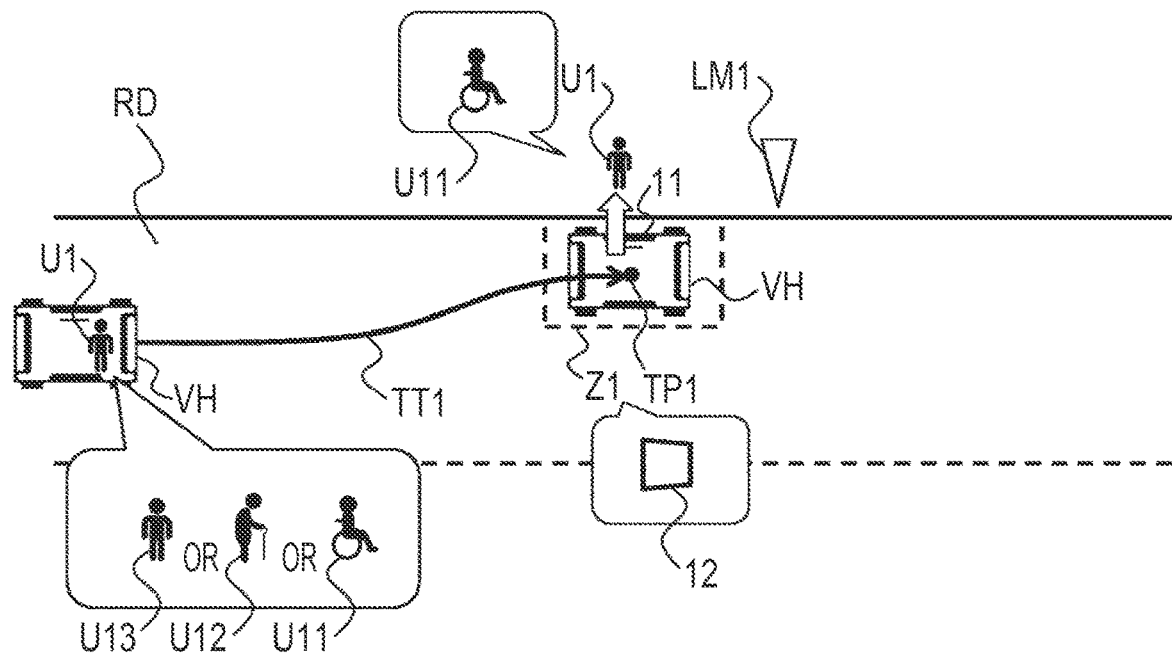
FIG. 2 is a diagram illustrating the outline of the ride-sharing service (drop-off)
Figure 3:
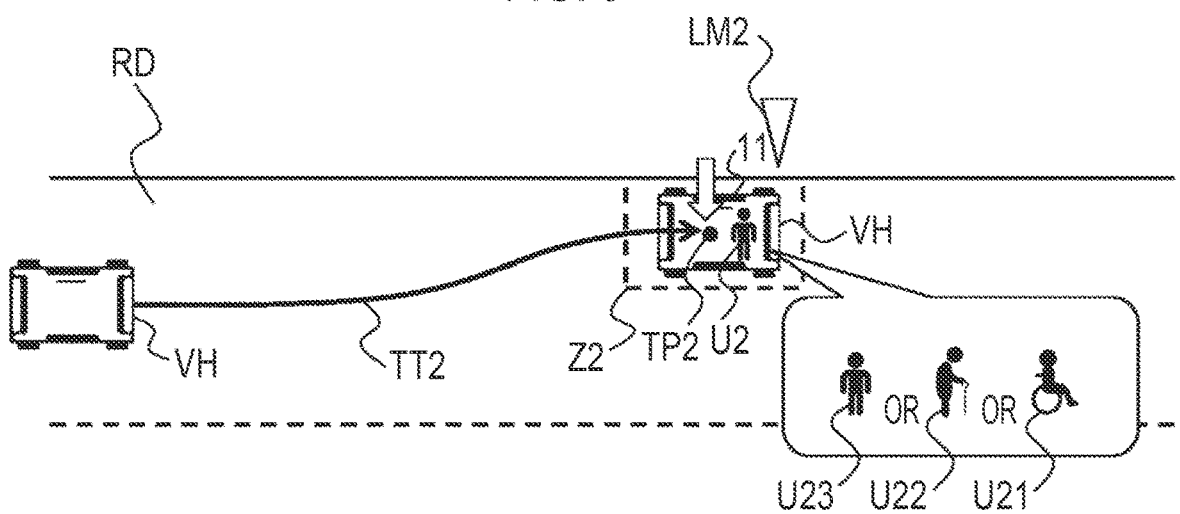
FIG. 3 is a diagram illustrating the outline of the ride-sharing service (pick-up)

A ride-sharing service is a service that transports an unspecified large number of users (pedestrians) while performing pick-up and drop-off of the users during traveling of one ride-sharing vehicle. FIGS. 1 to 3 are diagrams illustrating the outline of the ride-sharing service. In FIGS. 1 to 3, a ride-sharing vehicle VH (hereinafter, simply referred to as a "vehicle VH") that travels on a road RD is drawn. The vehicle VH is, for example, an autonomous driving vehicle that can perform driverless driving. A driver may be on the vehicle VH.

In FIGS. 1 and 2, a user U1 of the ride-sharing service is drawn. As shown in FIG. 1, the user U1 gets off the vehicle VH near a landmark LM1. The landmark LM1 is a stationary object for specifying a position where the user U1 wants to get off the vehicle VH. Examples of the landmark LM1 include a sign provided adjacent to the road RD, a building (a commercial facility, a railroad station, or a house, a school, or a workplace of the user U1) around the road RD, and an accessory of a sign or a building.

Drop-off of the user U1 by the vehicle VH is performed by a controller according to the embodiment executing "vehicle control". In the vehicle control for performing the drop-off, a zone Z1 is set. The zone Z1 is virtually set on the road RD in front of the vehicle VH. The zone Z1 has, for example, a predetermined size greater than the size of the vehicle VH.

In the vehicle control for performing the drop-off, a target track TT1 that connects a current position of the vehicle VH and a target stop position TP1 within the zone Z1 is generated. In the vehicle control, the vehicle VH is controlled such that the vehicle VH travels along the target track TT1. In the vehicle control, the vehicle VH is controlled such that a door 11 provided in a side surface of the vehicle VH is opened after the vehicle VH is stopped. After the door 11 is opened, the user U1 gets off the vehicle VH.

As shown in FIG. 2, the user U1 includes a vulnerable pedestrian U11, a quasi-vulnerable pedestrian U12, and a normal pedestrian U13. The vulnerable pedestrian U11 is a user who gets off the vehicle VH using a slope board 12 expanding on the side surface of the vehicle VH. Examples of the vulnerable pedestrian U11 include a wheelchair user. When the vulnerable pedestrian U11 gets off the vehicle VH, the zone Z1 is set in a space that is near the landmark LM1 and where the slope board 12 is expandable.

The quasi-vulnerable pedestrian U12 is a user who gets off the vehicle VH without using the slope board 12, but has restrictions in movement and is difficult to quickly move under an situation where a quickly movement is required. Examples of the quasi-vulnerable pedestrian U12 include an aged person, a crutch user, a parent holding an infant in the arm, a baby carriage user, and a person with baggage, such as a suitcase. When the quasi-vulnerable pedestrian U12 gets off the vehicle VH, the zone Z1 is set in a space that is near the landmark LM1 and is at least flat.

The normal pedestrian U13 is a user who can get off the vehicle VH without using the slope board 12 and has no restriction in movement. The normal pedestrian U13 is a user that does not correspond to both the vulnerable pedestrian U11 and the quasi-vulnerable pedestrian U12. When the normal pedestrian U13 gets off the vehicle VH, the zone Z1 is set in any space that is near the landmark LM1.

In FIG. 3, a user U2 of the ride-sharing service is drawn. As shown in FIG. 3, the user U2 gets on the vehicle VH near a landmark LM2. The landmark LM2 is an object that specifies a position where the user U2 wants to get on the vehicle VH. Examples of the landmark LM2 are the same as the examples of the landmark LM1. As shown in FIG. 3, the user U2 includes the vulnerable pedestrian U21, the quasi-vulnerable pedestrian U22, and the normal pedestrian U23. Examples of the vulnerable pedestrian U21 and the like are the same as the examples of the vulnerable pedestrian U11 and the like.

Pick-up of the user U2 by the vehicle VH is realized by the controller according to the embodiment executing "vehicle control". In the vehicle control for performing the pick-up of the user U2, a zone Z2 is set. The concept of the zone Z2 is basically the same as the concept of the zone Z1.

In the vehicle control for performing the pick-up, a target track TT2 that connects the current position and a target stop position TP2 within the zone Z2 is generated. Examples of the target stop position TP2 include a position where the door 11 lies alongside the front of a waiting position of the user U2. In the vehicle control, the vehicle VH is controlled such that the vehicle VH travels along the target track TT2. In the vehicle control, the vehicle VH is controlled such that the door 11 is opened after the vehicle VH is stopped. After the door 11 is opened, the user U2 gets on the vehicle VH.

Although the user U1 and the user U2 are distinguished for convenience of description, when the user U2 gets off the vehicle VH, the user U2 will be described as the user U1. In the specification, "first" is attached to contents related to drop-off of a user by the vehicle VH. Furthermore, "second" is attached to contents related to pick-up of a user by the vehicle VH. For example, the user U1 is a "first user", the zone Z1 is a "first zone", and the target stop position TP1 is a "first target stop position". The user U2 is a "second user", the zone Z2 is a "second zone", and the target stop position TP2 is a "second target stop position".

1-2. Problem of Ride-Sharing Service

In the ride-sharing service, an unspecified large number of users use one vehicle VH simultaneously. For this reason, the position of the landmark LM1 and the position of the landmark LM2 coincide with each other or a distance therebetween is shortened. Then, a problem that the zone Z1 and the zone Z2 overlap partially or wholly occurs.

Figure 4:
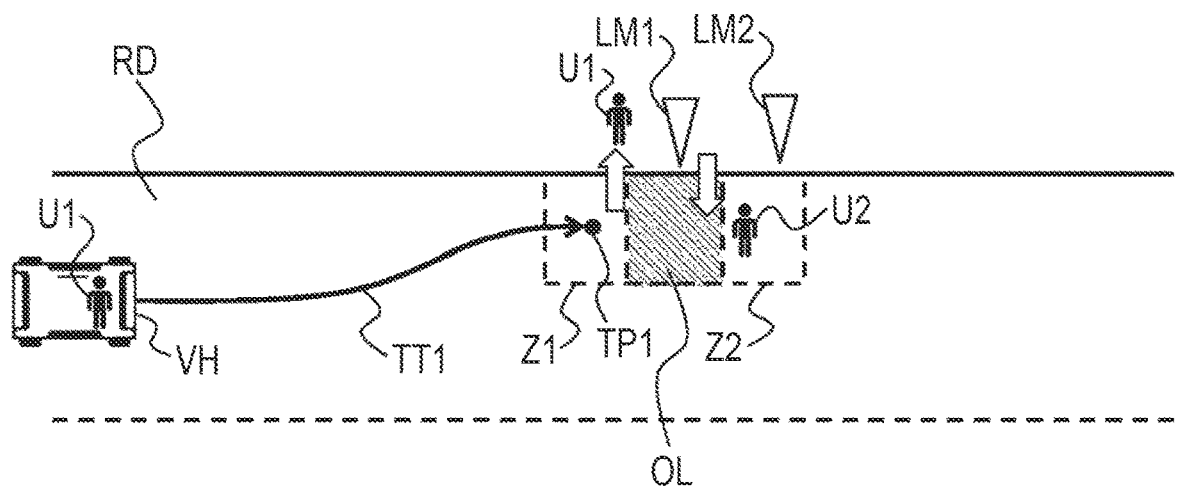
FIG. 4 is a diagram illustrating a problem of the ride-sharing service.

FIG. 4 is a diagram illustrating the problem of the ride-sharing service. In FIG. 4, the user U1 described referring to FIGS. 1 and 2 and the user U2 described referring to FIG. 3 are drawn. In an example shown in FIG. 4, the position of the landmark LM1 is near the position of the landmark LM2, and a partial region OL of the zone Z1 overlaps the zone Z2. In this case, in a case where the vehicle VH having traveled along the target track TT1 and opens the door 11 at the target stop position TP1, a getting-off operation of the user U1 and a getting-on operation of the user U2 interfere. The interference of the getting-off and getting-on operations of the user U1 and the user U2 causes degradation of the safety of the user U1 and the user U2.

The problem of safety is conspicuous when one of the user U1 and the user U2 is a vulnerable pedestrian or a quasi-vulnerable pedestrian. In a case where the getting-on operation is performed before the getting-off operation, the completion of the getting-off operation is likely to be delayed. Such a delay causes degradation of the convenience of the ride-sharing service. Accordingly, in the embodiment, in the vehicle control for performing at least one of the drop-off and the pick-up, determination is made whether or not the zone Z1 and the zone Z2 overlap. Then, when determination is made that the zone Z1 and the zone Z2 overlap, resetting of the zone Z1 is performed.

1-3. Features of Vehicle Control

Figure 5:
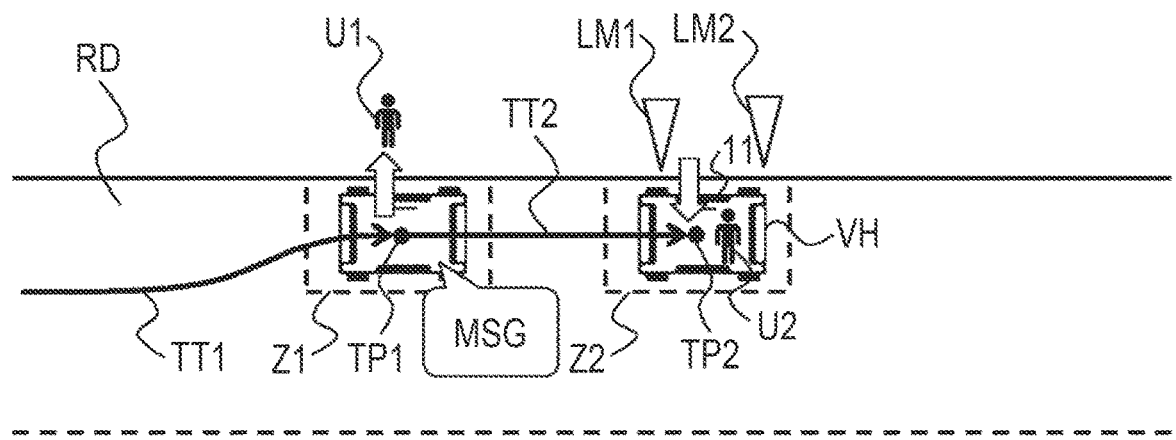
FIG. 5 is a diagram illustrating features of vehicle control according to an embodiment.
Figure 6:
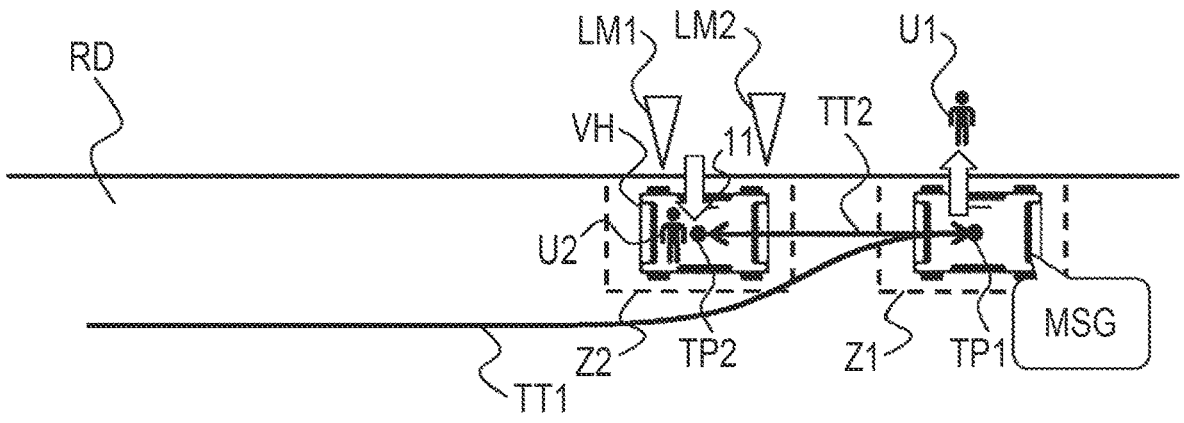
FIG. 6 is a diagram illustrating features of the vehicle control according to the embodiment.

FIGS. 5 and 6 are diagrams illustrating features of the vehicle control according to the embodiment. The zone Z1 shown in FIGS. 5 and 6 is an example of the reset zone Z1. The zone Z1 shown in FIGS. 5 and 6 is set in, for example, a space that is near the landmark LM1 and does not overlap the zone Z2. In an example shown in FIG. 5, the zone Z1 is set in a space before the zone Z2. In an example shown in FIG. 6, the zone Z1 is set in a space behind the zone Z2.

After the zone Z1 is reset, a target track TT1 that connects a target stop position TP1 within the zone Z1 and a current position is generated. The contents of the vehicle control after the target track TT1 is generated are the same as the contents described referring to FIGS. 1 and 2.

In the examples shown in FIGS. 5 and 6, after the arrival at the target stop position TP1, a target track TT2 is generated. The target track TT2 is a target track that connects the target stop position TP1 and a target stop position TP2. The contents of the vehicle control after the target track TT2 is generated are the same as those described referring to FIG. 3. In the example shown in FIG. 5, the vehicle VH moves forward. In contrast, in the example shown in FIG. 6, the vehicle VH moves backward.

In the examples shown in FIGS. 5 and 6, a message MSG (for example, "Please wait as you are if you wants to get on the vehicle') toward a pedestrian (for example, the waiting user U2) outside the vehicle may be displayed. The message MSG is displayed, for example, on a display provided on a side surface, a front surface, or a rear surface outside the vehicle VH.

In this way, with the vehicle control according to the embodiment, when determination is made that the zone Z1 and the zone Z2 overlap, the zone Z1 is set in a space not overlapping the zone Z2. In a case where the zone Z1 is set in the space not overlapping the zone Z2, the zone Z2 and the zone Z1 are separated in terms of position, and a getting-off operation and a getting-on operation are separated in terms of time. Accordingly, it is possible to secure the safety of the user U1 and the user U2. Since the getting-off operation is performed before the getting-on operation, it is possible to suppress degradation of the convenience of the ride-sharing service.

Hereinafter, the controller according to the embodiment will be described in detail.

2. Controller for Ride-Sharing Vehicle

2-1. Overall Configuration Example of Ride-Sharing Vehicle

Figure 7:
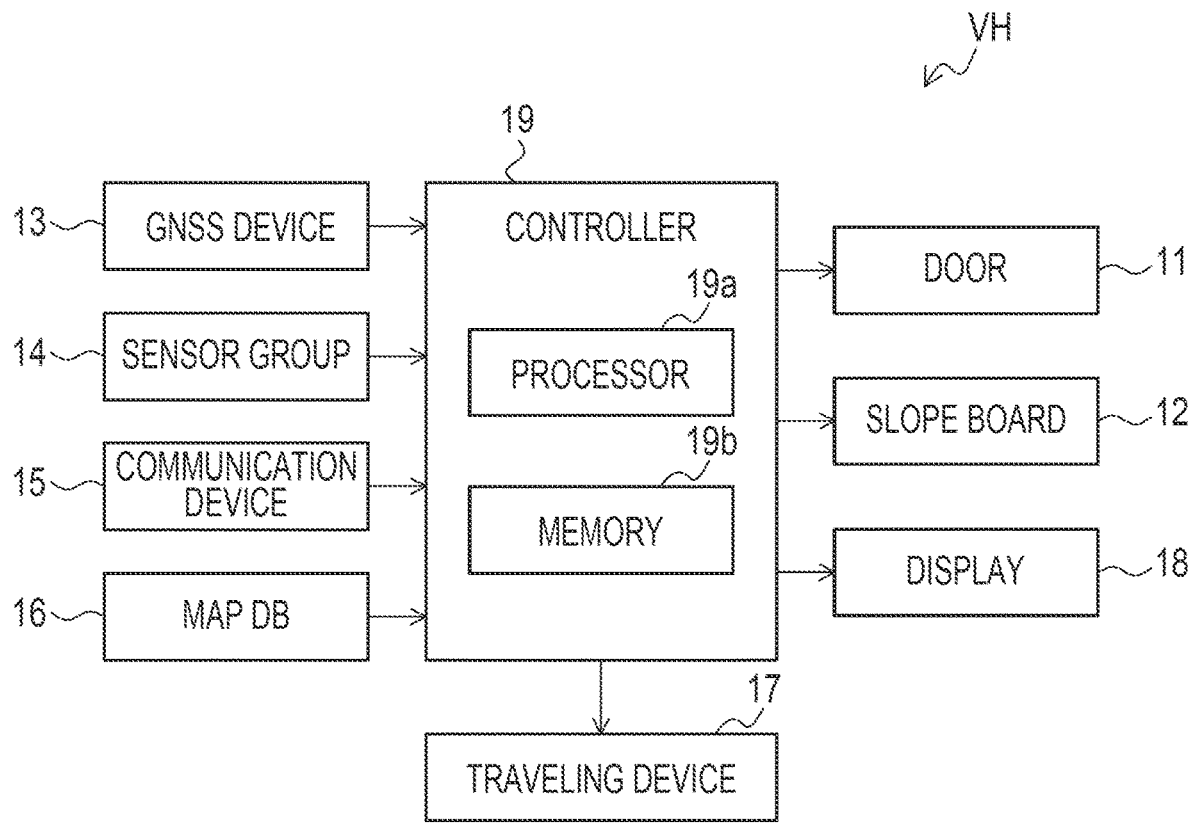
FIG. 7 is a block diagram showing a configuration example of a ride-sharing vehicle.

FIG. 7 is a block diagram showing a configuration example of the vehicle VH. As shown in FIG. 7, the vehicle VH includes a door 11, a slope board 12, a global navigation satellite system (GNSS) device 13, a sensor group 14, a communication device 15, a map database (map DB) 16, a traveling device 17, a display 18, and a controller 19. The elements, such as the door 11, and the controller 19 are connected, for example, by an in-vehicle network (for example, controller area network (CAN)).

The door 11 is provided on a platform of the vehicle VH. For example, one platform is provided on a left side surface of the vehicle VH. Note that the place of the platform and the total number of platforms are not limited thereto, and are changed as appropriate depending on a road environment in which the vehicle VH is operated. The door 11 includes an actuator that performs the opening and closing of the door 11. The actuator is driven based on a control signal from the controller 19.

The slope board 12 helps the getting-off operation of the user U1 (vulnerable pedestrian U11) and the getting-on operation of the user U2 (vulnerable pedestrian U21). The slope board 12 includes an actuator that performs the expansion and storage of the slope board 12. The actuator is driven based on a control signal from the controller 19.

The global navigation satellite system (GNSS) device 13 is a device that receives signals from three or more artificial satellites. The GNSS device 13 acquires data (latitude and longitude data) of a position of the vehicle VH. The GNSS device 13 calculates a current position and a posture (azimuth) of the vehicle VH based on the received signals. The GNSS device 13 transmits data of the current position and the posture of the vehicle VH to the controller 19.

The sensor group 14 includes internal sensors and external sensors. The internal sensors acquire data regarding a traveling situation of the vehicle VH. Examples of the internal sensors include a wheel speed sensor, an acceleration sensor, a yaw rate sensor, and a steering angle sensor. The external sensors acquire data regarding an ambient environment of the vehicle VH. Examples of the external sensors include a camera, a millimeter-wave radar, and laser imaging detection and ranging (LIDAR). The camera images at least the front of the vehicle VH. The camera may image the inside of a cabin of the vehicle VH. The sensor group 14 transmits the acquired data to the controller 19.

Processing, such as detection of an object around the vehicle VH, measurement of a relative position and a relative speed of the detected object with respect to the vehicle VH, and recognition of the detected object, is performed with data acquired by the external sensor. Recognition processing of the user U2 may be performed with data acquired by the external sensor. In this case, in a case where the user U2 is recognized, a waiting position of the user U2 is specified.

The communication device 15 receives data provided from an external server, from a wireless communication network. Examples of data provided from the external server include data regarding pick-up and drop-off of users. Examples of a communication standard of wireless communication include the standards of mobile communication, such as 4G, LTE, and 5G.

The map database 16 stores map data. Examples of the map data include data (for example, classifications of a curved road and a linear road) of positions and shapes of roads, and data of positions of intersections and structures. The map data includes data regarding traffic regulations. The map database 16 is formed in an in-vehicle storage device (for example, a hard disk or a flash memory). The map database 16 may be formed in the external server.

The traveling device 17 includes a steering device, a drive device, and a braking device. The steering device turns the tires of the vehicle VH. The steering device includes, for example, an electric power steering (EPS) device. The drive device is a power source that generates drive power. Examples of the drive device include an electric motor and an internal combustion engine. The braking device gives braking force to the vehicle VH.

The display 18 is provided inside and outside of the vehicle VH. Data regarding an operation situation of the vehicle VH is output to the display 18. Data of the message MSG outward of the vehicle may be output to the display 18 provided outside the vehicle VH.

The controller 19 is an example of a controller according to the embodiment. The controller 19 is configured of a computer having at least one processor 19a and at least one memory 19b. The processor 19a includes a central processing unit (CPU). The memory 19b is a volatile memory, such as a double data rate (DDR) memory, and develops programs that are used in the processor 19a and temporarily stores various kinds of data. The programs stored in the memory 19b are read out and executed by the processor 19a, whereby various functions of the controller 19 are realized.

The controller 19 may be a set of a plurality of computers. The controller 19 may not be mounted in the vehicle VH. For example, the controller 19 may be the external server. In this case, the server as the controller 19 acquires various kinds of data through the communication device 15 and generates data needed for the vehicle control of the vehicle VH. Then, the server as the controller 19 transmits the generated data to the communication device 15.

2-2. Examples of Various Kinds of Data

Figure 8:
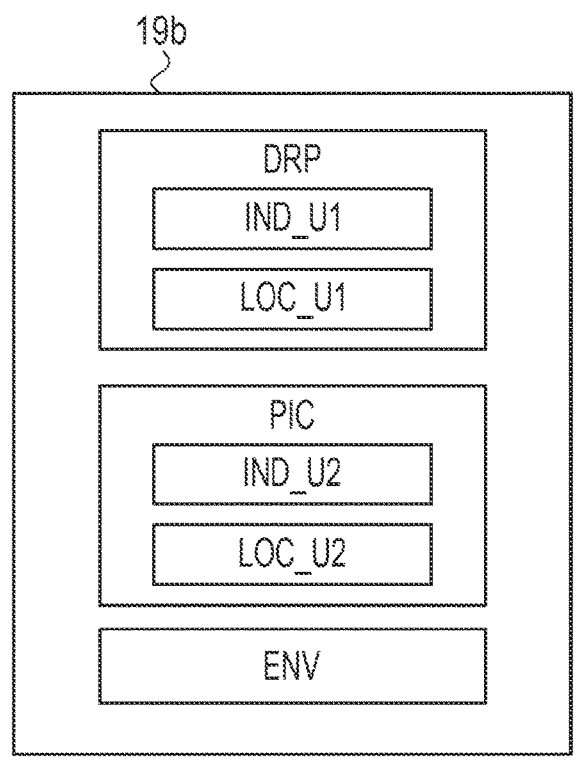
FIG. 8 is a block diagram showing an example of data that is stored in a memory of a controller according to the embodiment.

Here, a configuration example of data related to the vehicle control of the vehicle VH will be described referring to FIG. 8. FIG. 8 is a block diagram showing an example of data that is stored in the memory 19b. As shown in FIG. 8, drop-off data DRP, pick-up data PIC, and driving environment data ENV are stored in the memory 19b.

The drop-off data DRP is data regarding the drop-off of the user U1. The drop-off data DRP includes data of an attribute IND_U1 and data of a scheduled position LOC_U1 where the drop-off is performed. The attribute IND_U1 includes classifications of a vulnerable pedestrian, a quasi-vulnerable pedestrian, and a normal pedestrian. The attribute IND_U1 is registered in advance, for example. The scheduled position LOC_U1 (first scheduled position) is a position where the user U1 wants to get off the vehicle VH. A typical scheduled position LOC_U1 is a position of a landmark LM1. The scheduled position LOC_U1 is set by the user U1 before the user U1 gets on the vehicle VH. The scheduled position LOC_U1 may be set by the user U1 after the user U1 gets on the vehicle VH.

The pick-up data PIC is data regarding the pick-up of the user U2. The pick-up data PIC includes data of an attribute IND_U2 and data of a scheduled position LOC_U2 where the pick-up is performed. The classifications of the attribute IND_U2 are the same as the classifications of the attribute IND_U1. The scheduled position LOC_U2 (second scheduled position) is a position where the user U2 wants to get on the vehicle VH. A typical scheduled position LOC_U2 is a position of a landmark LM2. The scheduled position LOC_U2 is set by the user U2 before the user U2 gets on the vehicle VH. The scheduled position LOC_U2 may be a waiting position of the user U2 specified by recognition processing.

The driving environment data ENV is data regarding a driving environment of the vehicle VH. Examples of the driving environment data ENV include data of weather of an operation area of the vehicle VH (fair, cloudy, rainy, and snowy), data of a road surface situation of a road RD on which the vehicle VH travels, and data of positions of buildings around the road RD. Data of weather is acquired by, for example, the communication device 15. Data of the road surface situation is acquired by, for example, recognition processing using the camera. Data of the positions of the buildings is acquired from the map database 16.

2-3. Processing Example by Controller

Figure 9:
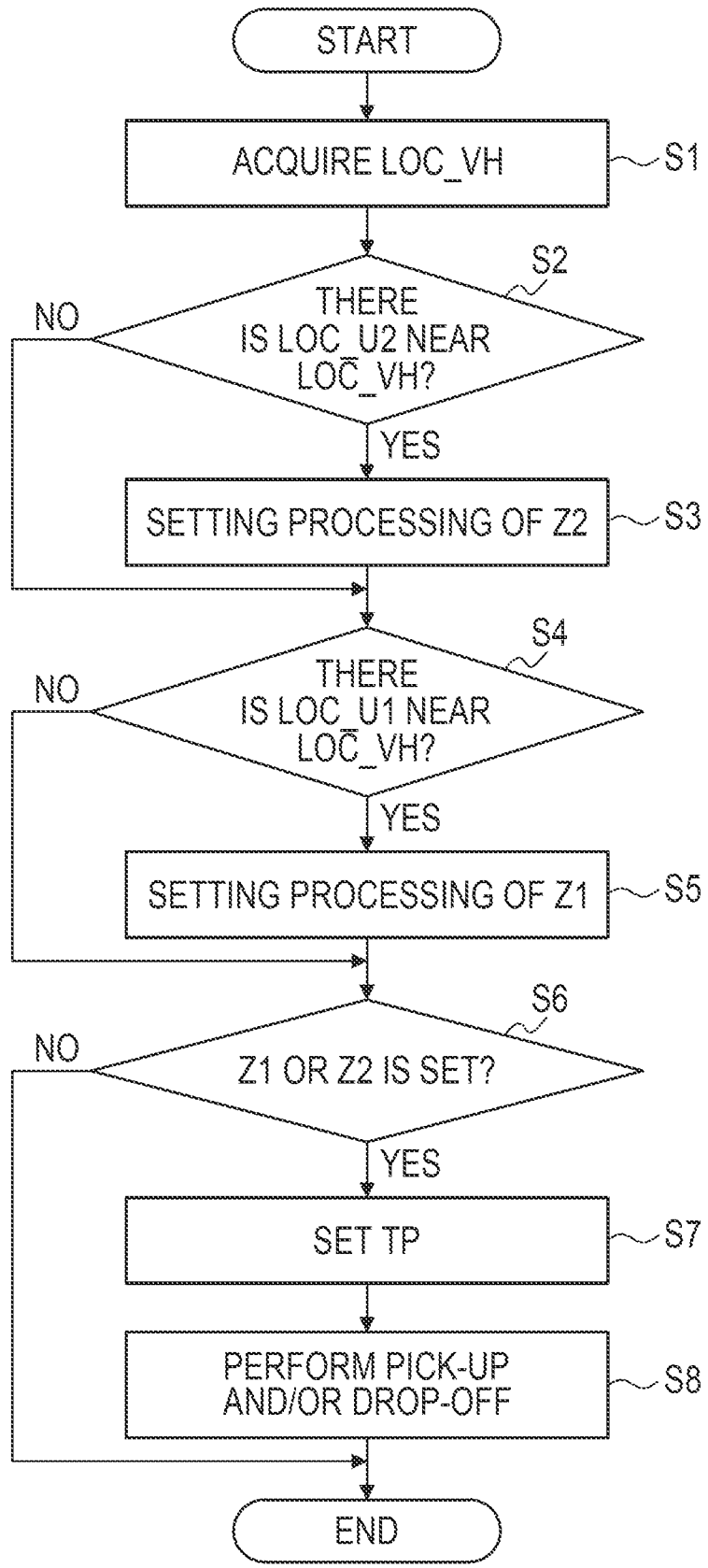
FIG. 9 is a flowchart illustrating a flow of vehicle control that is executed by the controller (processor) according to the embodiment.

FIG. 9 is a flowchart illustrating a flow of vehicle control that is executed by the controller 19 (processor 19a). A routine shown in FIG. 9 is repeatedly executed in a predetermined control cycle.

In the routine shown in FIG. 9, first, data of a current position LOC_VH is acquired (Step S1). The current position LOC_VH is the current position of the vehicle VH calculated by the GNSS device 13.

Subsequently to the processing of Step S1, determination is made whether or not there is the scheduled position LOC_U2 near the current position LOC_VH (Step S2). As described above, the scheduled position LOC_U2 is the position where the user U2 wants to get on the vehicle VH. When a distance D_U2 (second distance) between the current position LOC_VH and the scheduled position LOC_U2 is shorter than a second threshold value, determination is made that there is the scheduled position LOC_U2 near the current position LOC_VH. When a determination result of Step S2 is affirmative, the setting processing of the zone Z2 is performed (Step S3). Details of the processing of Step S3 will be described below.

Subsequently to the processing of Step S3, determination is made whether or not there is the scheduled position LOC_U1 near the current position LOC_VH (Step S4). The processing of Step S4 is also performed when the determination result of Step S2 is negative. As described above, the scheduled position LOC_U1 is the position where the user U1 wants to get off the vehicle VH. When a distance D_U1 (first distance) between the current position LOC_VH and the scheduled position LOC_U1 is shorter than a first threshold value, determination is made that there is scheduled position LOC_U1 near the current position LOC_VH. When a determination result of Step S4 is affirmative, the setting processing of the zone Z1 is performed (Step S5). Details of the processing of Step S5 will be described below.

Subsequently to the processing of Step S5, determination is made whether or not the zone Z1 or Z2 is set (Step S6). The processing of Step S6 is also performed when the determination result of Step S4 is negative. In a case where the processing of Step S3 is performed, the zone Z2 is set. In a case where the processing of Step S5 is performed, the zone Z1 is set. Accordingly, in the processing of Step S6, when determination is made that both the zone Z1 and the zone Z2 are not set, the processing of the vehicle control ends. On the other hand, when determination is made that at least one of the zone Z1 and the zone Z2 is set, a target stop position TP is set (Step S7). Details of the processing of Step S7 will be described below.

Subsequently to the processing of Step S7, at least one of the drop-off and the pick-up is performed (Step S8). For example, when the zone Z1 is set, the target stop position TP1 is set in the processing of Step S7. In this case, a target track TT1 that connects the current position LOC_VH and the target stop position TP1 is generated in the processing of Step S8. On the other hand, when the zone Z2 alone is set, the target stop position TP2 alone is set in the processing of Step S7. In this case, a target track TT2 that connects the current position LOC_VH and the target stop position TP2 is generated.

In the processing of Step S8, control (for example, at least one kind of control of steering control and deceleration control) of the traveling device 17 is performed such that the vehicle VH follows the generated target track TT1 or the generated target track TT2. After the vehicle VH is stopped at the target stop position TP1 or the target stop position TP2, opening and closing control of the door 11 is performed. In this case, expansion and storage control of the slope board 12 is also performed based on the attribute IND_U1 or IND_U2.

When both the zone Z1 and the zone Z2 are set, while the drop-off is being executed or after the execution of the drop-off is completed, the target track TT2 that connects the current position LOC_VH and the target stop position TP2 is generated. Then, control (for example, at least one kind of control of steering control and deceleration control) of the traveling device 17 is performed such that the vehicle VH follows the generated target track TT2. After the vehicle VH is stopped at the target stop position TP2, the opening and closing control of the door 11 is performed. In this case, the expansion and storage control of the slope board 12 is also performed based on the attribute IND_U2.

2-4. Setting Processing Example of Zone Z2

Figure 10:
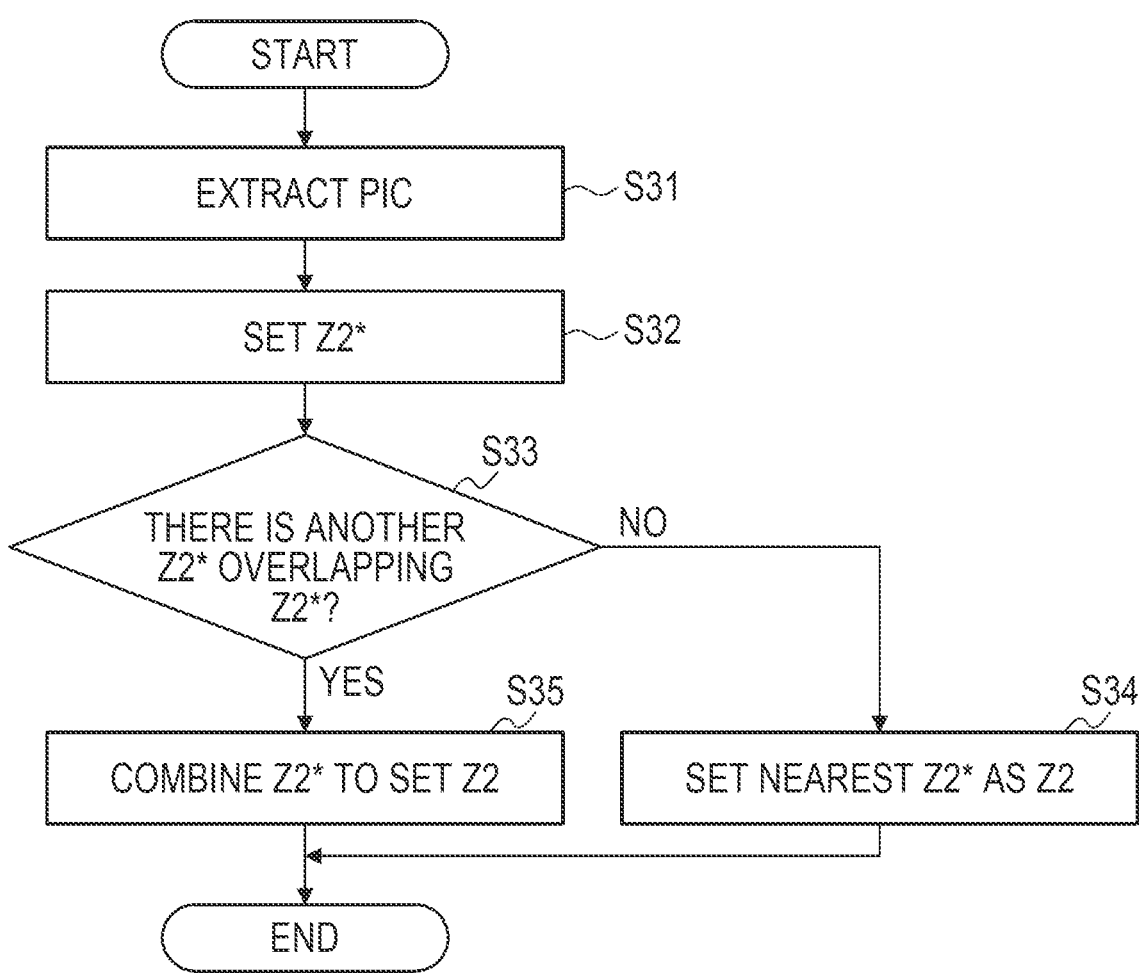
FIG. 10 is a flowchart illustrating a flow of setting processing of a second zone that is performed in Step S3 of FIG. 9.

FIG. 10 is a flowchart illustrating a flow of the setting processing of the zone Z2 (second zone) that is performed in Step S3 of FIG. 9.

In a routine shown in FIG. 10, first, the pick-up data PIC is extracted (Step S31). The pick-up data PIC to be extracted is data including data of the scheduled position LOC_U2 having the distance D_U2 determined to be shorter than the second threshold value in the processing of Step S2 of FIG. 9.

Subsequently to the processing of Step S31, a candidate Z2* of the zone Z2 is set (Step S32). The candidate Z2* is set along the side of the road RD in front of the vehicle VH centering on the scheduled position LOC_U2, for example. When there is a plurality of pieces of data of the scheduled positions LOC_U2, the candidate Z2* is set for each scheduled position LOC_U2.

Subsequently to the processing of Step S32, determination is made whether or not there is the candidate Z2* overlapping a nearest candidate Z2* (Step S33). The nearest candidate Z2* (nearest second zone candidate) is the candidate Z2* set based on the scheduled position LOC_U2 having a shortest distance D_U2 among the scheduled positions LOC_U2 extracted in the processing of Step S31. As described above, the zone Z1 and the zone Z2 have a predetermined size. For this reason, when there is a plurality of pieces of data of the scheduled positions LOC_U2, the nearest candidate Z2* is likely to overlap another candidate Z2* (second alternative candidate).

When a determination result of Step S33 is negative, the nearest candidate Z2* is set as the zone Z2 (Step S34). For example, when the number of pieces of data of the scheduled positions LOC_U2 is one, the number of nearest candidates Z2* is one. Even when there is a plurality of pieces of data of the scheduled positions LOC_U2, in a case where the nearest candidate Z2* and another candidate Z2* are separated, the nearest candidate Z2* and another candidate Z2* do not overlap. In such a case, the nearest candidate Z2* is set as the zone Z2.

Figure 11:
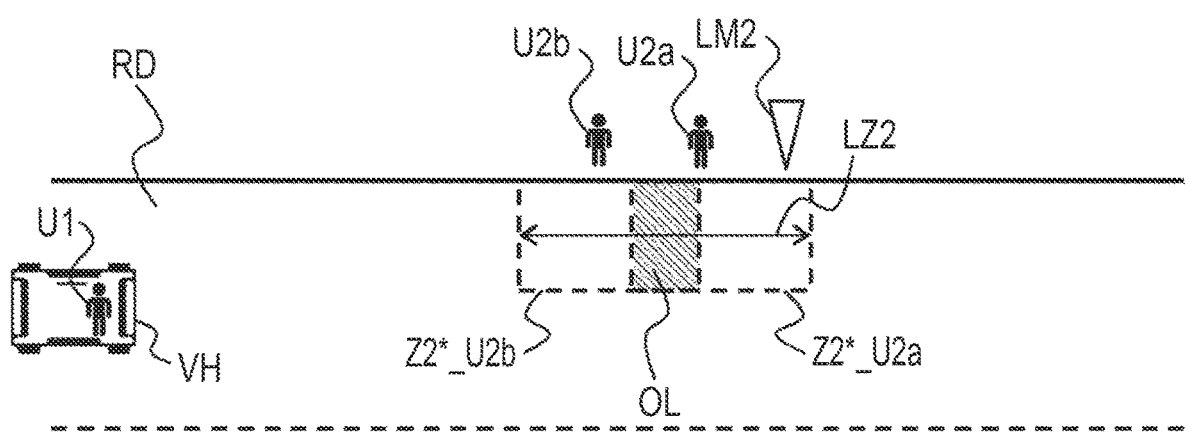
FIG. 11 is a diagram illustrating processing of Step S35 of FIG. 10.

When the determination result of Step S33 is affirmative, the nearest candidate Z2* and another candidate Z2* overlapping the nearest candidate Z2* are combined, and the zone Z2 is set (Step S35). FIG. 11 is a diagram illustrating the processing of Step S35. In an example shown in FIG. 11, a user U2a and a user U2b are waiting in line near the landmark LM2. In such a case, a partial region OL of the nearest candidate Z2* (Z2*_U2b) overlaps another candidate Z2* (Z2*_U2a). Accordingly, in the processing of Step S35, the above-described candidates Z2* are combined to set the zone Z2. As a result, a length LZ2 in a vehicle lengthwise direction of the zone Z2 after combination is enlarged compared to the length in the vehicle lengthwise direction of the zone Z2 before combination.

2-5. Setting Processing Example of Zone Z1

Figure 12:
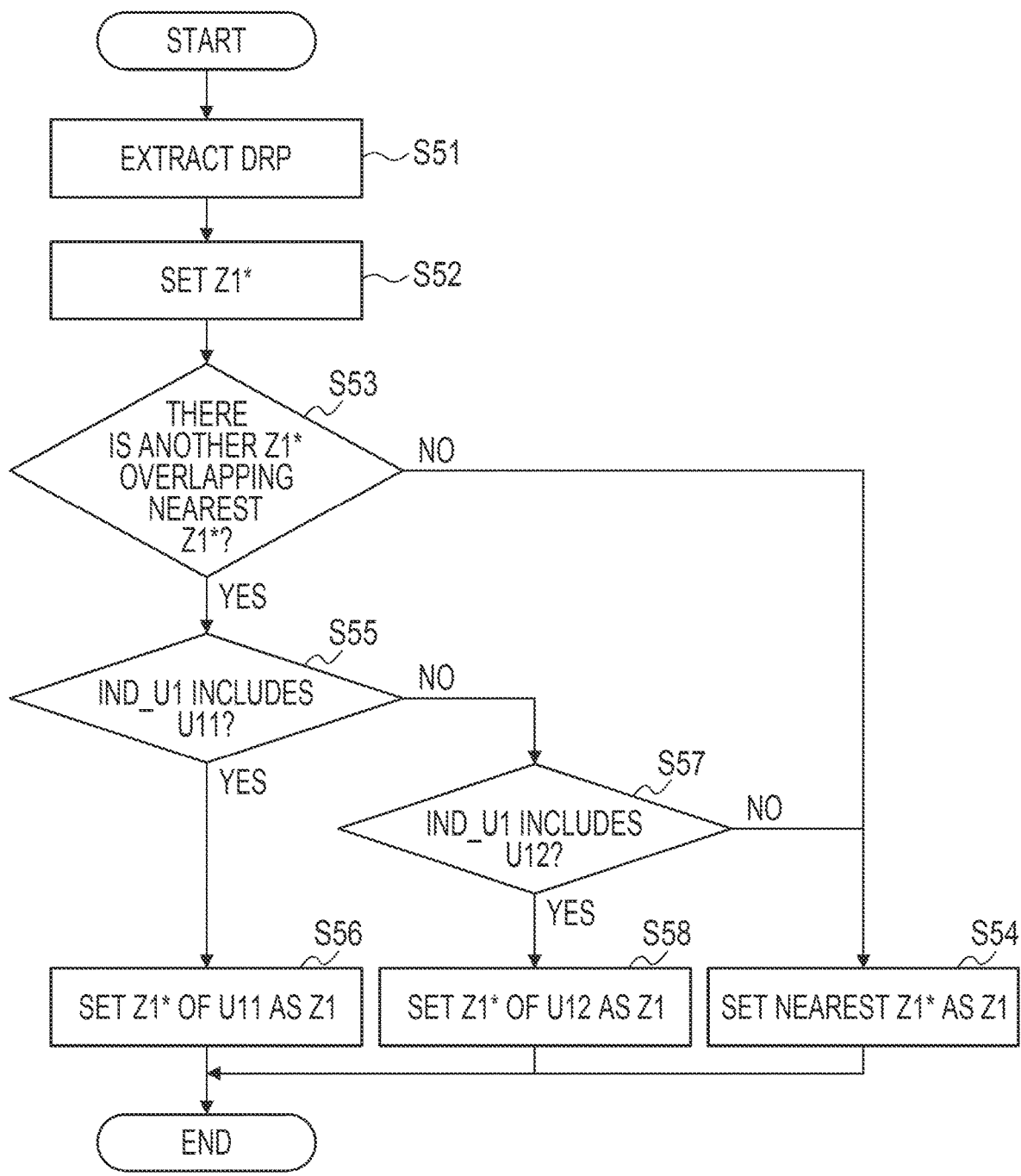
FIG. 12 is a flowchart illustrating a flow of setting processing of a first zone that is performed in Step S5 of FIG. 9.

FIG. 12 is a flowchart illustrating a flow of the setting processing of the zone Z1 (first zone) that is performed in Step S5 of FIG. 9.

In a routine shown in FIG. 12, first, the drop-off data DRP is extracted (Step S51). The drop-off data DRP to be extracted is data including data of the scheduled position LOC_U1 having the distance D_U1 determined to be shorter than the first threshold value in the processing of Step S4 of FIG. 9.

Subsequently to the processing of Step S51, a candidate Z1* of the zone Z1 is set (Step S52). The candidate Z1* is set along the side of the road RD in front of the vehicle VH centering on the scheduled position LOC_U1, for example. When there is a plurality of pieces of data of the scheduled positions LOC_U1, the candidate Z1* is set for each scheduled position LOC_U1.

Subsequently to the processing of Step S52, determination is made whether or not there is another candidate Z1* overlapping a nearest candidate Z1* (Step S53). The nearest candidate Z1* (nearest first zone candidate) is the candidate Z1* set based on the scheduled position LOC_U1 having a shortest distance D_U1 among the scheduled positions LOC_U1 extracted in the processing of Step S51.

When a determination result of Step S53 is negative, the nearest candidate Z1* is set as the zone Z1 (Step S54). For example, when the number of pieces of data of the scheduled positions LOC_U1 is one, the number of nearest candidates Z1* is one. Even when there is a plurality of pieces of data of the scheduled positions LOC_U1, in a case where the nearest candidate Z1* and another candidate Z1* (first alternative candidate) are separated, the nearest candidate Z1* and another candidate Z1* do not overlap. In such a case, the nearest candidate Z1* is set as the zone Z1.

When the determination result of Step S53 is affirmative, determination is made whether or not the data of the user U1 (vulnerable pedestrian U11) is included in the data of the attribute IND_U1 (Step S55). The data of the attribute IND_U is data included in the same drop-off data DRP as the data of the scheduled position LOC_U1 extracted in the processing of Step S51. When a determination result of Step S55 is affirmative, the candidate Z1* set based on the scheduled position LOC_U1 of the user U1 (vulnerable pedestrian U11) is set as the zone Z1 (Step S56).

When the determination result of Step S55 is negative, determination is made whether or not the data of the user U1 (quasi-vulnerable pedestrian U12) is included in the data of the attribute IND_U1 (Step S57). The contents of the processing of Step S57 are basically the same as the contents of the processing of Step S55. When a determination result of Step S57 is affirmative, the candidate Z1* set based on the scheduled position LOC_U1 of the user U1 (quasi-vulnerable pedestrian U12) is set as the zone Z1 (Step S58).

In this way, with the processing of Steps S53 to S58, when there is the candidate Z1* overlapping the nearest candidate Z1*, the zone Z1 is set based on the attribute of the user U1. When the attribute of the user U1 is classified into a large number of classifications, the zone Z1 is set depending on a preferential order of the vulnerable pedestrian U11, the quasi-vulnerable pedestrian U12, and the normal pedestrian U13.

2-6. Setting Processing Example of Target Stop Position TP

Figure 13:
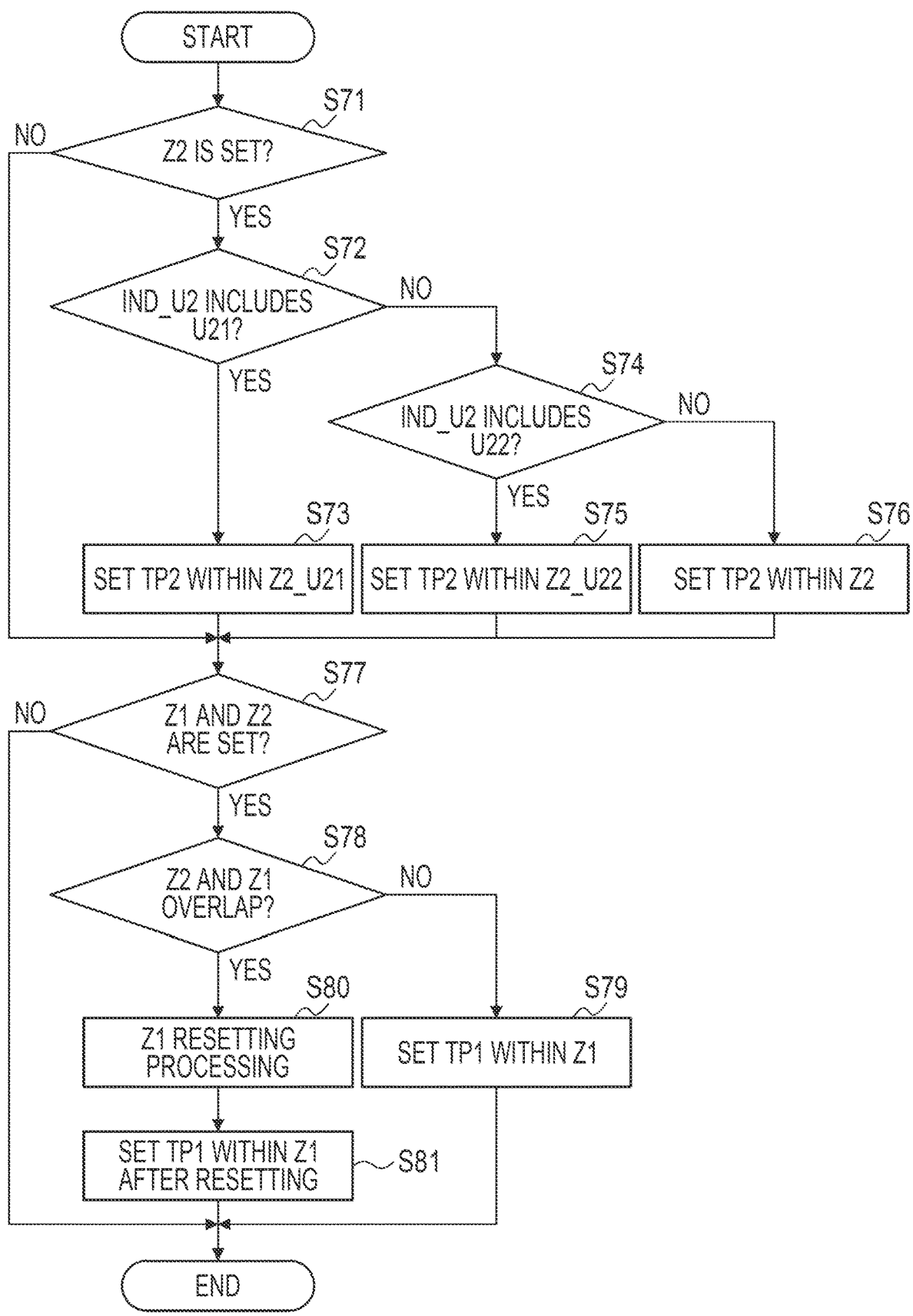
FIG. 13 is a flowchart illustrating a flow of setting processing of a target stop position that is performed in Step S7 of FIG. 9.

FIG. 13 is a flowchart illustrating a flow of the setting processing of the target stop position TP that is performed in Step S7 of FIG. 9.

In a routine shown in FIG. 13, first, determination is made whether or not the zone Z2 is set (Step S71). When a determination result of Step S71 is negative, the process progresses to the processing of Step S77.

When the determination result of Step S71 is affirmative, determination is made whether or not the data of the user U2 (vulnerable pedestrian U21) is included in the data of the attribute IND_U2 (Step S72). The data of the attribute IND_U2 is data included in the same pick-up data PIC as the data of the scheduled position LOC_U2 extracted in the processing of Step S31 of FIG. 10. When a determination result of Step S72 is affirmative, a target stop position TP2 is set within a zone Z2_U21 (Step S73).

Here, the zone Z2_U21 is the candidate Z2* set based on the scheduled position LOC_U2 of the user U2 (vulnerable pedestrian U21). The target stop position TP2 is set at a position of the center of the zone Z2_U21, for example. When a waiting position of the user U2 (vulnerable pedestrian U21) is specified, the target stop position TP2 is set in front of the waiting position.

When a determination result of Step S72 is negative, determination is made whether or not the data of the user U2 (quasi-vulnerable pedestrian U22) is included in the data of the attribute IND_U2 (Step S74). The contents of the processing of Step S74 are basically the same as the contents of the processing of Step S72. When a determination result of Step S74 is affirmative, the target stop position TP2 is set within a zone Z2_U22 (Step S75).

Here, the zone Z2_U22 is the candidate Z2* set based on the scheduled position LOC_U2 of the user U2 (quasi-vulnerable pedestrian U22). The target stop position TP2 is set at a position of the center of the zone Z2_U22, for example. When a waiting position of the user U2 (quasi-vulnerable pedestrian U22) is specified, the target stop position TP2 is set in front of the waiting position.

When the determination result of Step S74 is negative, the target stop position TP2 is set at any position within the zone Z2 (Step S76). The negative determination result of Step S74 means that the data of the attribute IND_U2 is the data of the normal pedestrian U23 alone. When a waiting position of the user U2 (normal pedestrian U23) is specified, the target stop position TP2 is set in front of the waiting position. When a waiting position of the user U2 (normal pedestrian U23) who waits at the head of a line is specified, the target stop position TP2 is set in front of the waiting position.

In this way, with the processing of Steps S71 to S76, when the zone Z2 is set, the target stop position TP2 is set based on the attribute of the user U2. When the attribute of the user U2 is classified into a large number of classifications, vulnerable pedestrian U21, the target stop position TP2 is set depending on a preferential order of the quasi-vulnerable pedestrian U22 and the normal pedestrian U23.

In the processing of Step S77, determination is made whether or not the zone Z1 and the zone Z2 are set. As described above, in a case where the processing of Step S3 of FIG. 9 (that is, the processing of Steps S31 to S35 of FIG. 10) is performed, the zone Z2 is set. Furthermore, in a case where the processing of Step S5 of FIG. 9 (that is, the processing of Steps S51 to S58 of FIG. 12) is performed, the zone Z1 is set. When a determination result of Step S77 is negative, the processing of the routine shown in FIG. 13 ends, and the processing of Step S8 of FIG. 9 is performed.

When the determination result of Step S77 is affirmative, determination is made whether or not the zone Z2 and the zone Z1 overlap (Step S78). The processing of Step S78 is performed by comparison of the scheduled position LOC_U2 used in the processing of Step S34 of FIG. 10 and the scheduled position LOC_U1 used in the processing of Step S54, S56, or S58 of FIG. 12, for example. When the zone Z2 is set by combination of the candidate Z2*, the scheduled position LOC_U2 used in the setting of the candidate Z2* and the scheduled position LOC_U1 used in the processing of Step S54, S56, or S58 of FIG. 12 are compared.

When a determination result of Step S78 is negative, the target stop position TP1 is set within the zone Z1 (Step S79). As described above, the zone Z1 is set in the processing of Step S5 of FIG. 9 (that is, the processing of Steps S51 to S58 of FIG. 12). The target stop position TP1 is set at a position of the center of the zone Z1 set by the processing of Step S54, S56, or S58 of FIG. 12.

When the determination result of Step S78 is affirmative, the zone Z1 is reset (Step S80). In the processing of Step S80, the zone Z1 is set in consideration of the following conditions.

(1) the zone Z1 after resetting does not overlap the zone Z2
(2) the zone Z1 after resetting is positioned in a space near the landmark LM1
(3) the zone Z1 after resetting satisfies the same attribute condition as the attribute condition of the user U1 before setting The condition (3) will be supplemented. When the zone Z1 is set based on the scheduled position LOC_U1 of the user U1 (vulnerable pedestrian U11) (see Step S56 of FIG. 12), the condition (3) includes a condition that the zone is a space where the slope board 12 is expandable. When the zone Z1 is set based on the scheduled position LOC_U1 of the user U1 (quasi-vulnerable pedestrian U12) (see Step S58 of FIG. 12), the condition (3) includes a condition that the zone is at least a flat space.

When the zone Z1 is set based on the scheduled position LOC_U1 of the user U1 (normal pedestrian U13) (see Step S54 of FIG. 12), the condition (3) is not particularly limited. Note that, in this case, the zone Z1 after resetting may be a zone that is set in consideration of the driving environment data ENV instead of the condition (3).

Figure 14:
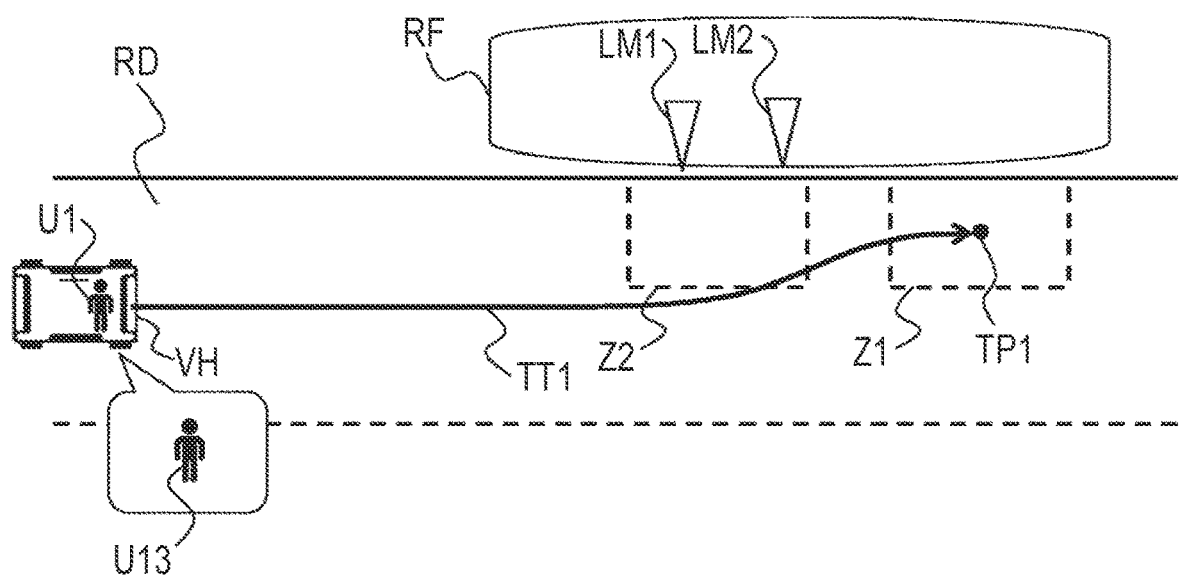
FIG. 14 is a diagram showing a first example of resetting of the first zone that is performed when the first user corresponds to a normal pedestrian.
Figure 15:
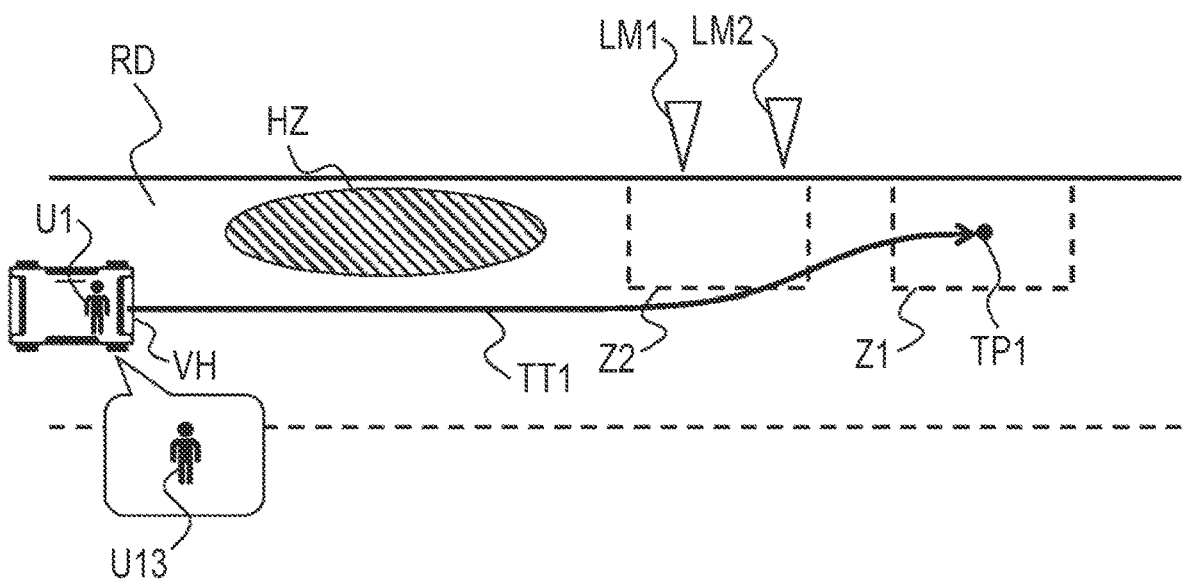
FIG. 15 is a diagram showing a second example of resetting of the first zone that is performed when the first user corresponds to a normal pedestrian.
Figure 16:
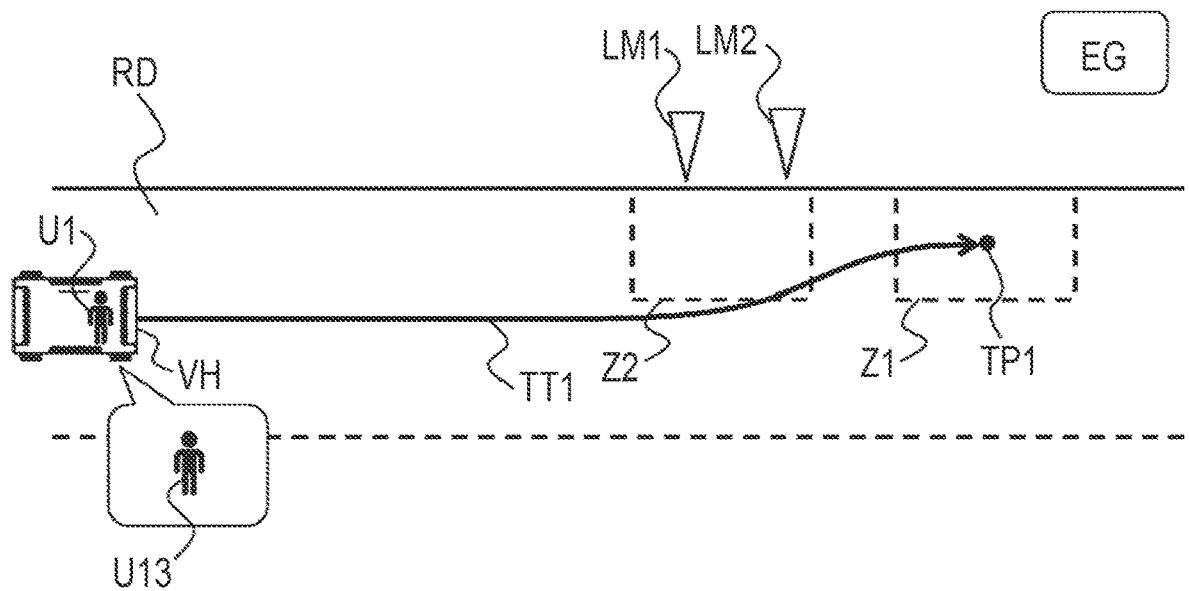
FIG. 16 is a diagram showing a third example of resetting of the first zone that is performed when the first user corresponds to a normal pedestrian.

FIGS. 14 to 16 are diagrams showing an example of resetting of the zone Z1 that is performed when the user U1 corresponds to the normal pedestrian U13. In an example shown in FIG. 14, weather data of an operation area and position data of a roof RF provided on the side of the road RD are combined. For example, when a situation in which the weather of an operation area is bad, and there is the roof RF near the landmark LM1 is recognized based on the driving environment data ENV, the zone Z1 is set in a space near the roof RF.

In an example shown in FIG. 15, the zone Z1 is set based on data of a road surface situation of the road RD. For example, when a puddle HZ is recognized between the zone Z2 and the vehicle VH based on the driving environment data ENV, the zone Z1 is set in a space away from the puddle HZ.

In an example shown in FIG. 16, the zone Z1 is set based on data of a position of a ticket gate EG of a railroad station around the road RD. For example, when the ticket gate EG is recognized to be positioned near the landmark LM1 based on the driving environment data ENV, the user U1 is predicted to go toward the railroad station. For this reason, in this case, the zone Z1 is set in a space nearer the ticket gate EG.

Returning to FIG. 13, the description of the setting processing of the target stop position TP will be continued. Subsequently to the processing of Step S80, the target stop position TP1 is set within the zone Z1 after resetting (Step S81). The target stop position TP1 is set at a position of the center of the zone Z1 set in the processing of Step S80, for example.

3. Effects

According to the embodiment, when both the zone Z1 and the zone Z2 are set, determination is made whether or not the zone Z1 and the zone Z2 overlap. Then, when determination is made that the zone Z1 and the zone Z2 overlap, the zone Z1 is reset in a space not overlapping the zone Z2. In a case where the zone Z1 is set in the space not overlapping the zone Z2, the zone Z2 and the zone Z1 are separated in terms of position, and a getting-off operation and a getting-on operation are separated in terms of time. Accordingly, it is possible to secure the safety of the user U1 and the user U2. It is also possible to suppress degradation of the convenience of the ride-sharing service.

According to the embodiment, when there is a plurality of candidates Z2* of the zone Z2, determination is made whether or not there is another candidate Z2* overlapping the nearest candidate Z2*. Then, when determination is made that there is another candidate Z2*, the zone Z2 is set by combining the above-described candidate Z2* with the nearest candidate Z2*. Accordingly, when the users U2 are waiting for the vehicle VH in line, it is possible to set the zone Z1 away from the line.

According to the embodiment, when there is a plurality of candidates Z1* of the zone Z1, determination is made whether or not there is another candidate Z1* overlapping the nearest candidate Z1*. Then, when determination is made that there is another candidate Z1*, the zone Z1 is set based on the data of the attribute IND_U1 included in the same drop-off data DRP as the data of the scheduled position LOC_U1 used in the setting of the above-described candidate Z1*. For this reason, even when the attribute IND_U1 is classified into a large number of classifications, it is possible to set the zone Z1 as appropriate.

According to the embodiment, when the attribute IND_U1 is classified into a large number of classifications, it is possible to set the zone Z1 depending on the preferential order of the vulnerable pedestrian U11, the quasi-vulnerable pedestrian U12, and the normal pedestrian U13.

According to the embodiment, not only when the setting of the zone Z1 is performed, but also when the resetting of the zone Z1 is performed, it is possible to set the zone Z1 based on the data of the attribute IND_U1.

According to the embodiment, when the resetting of the zone Z1 is performed, and when the user U1 corresponds to the normal pedestrian U13, it is possible to set the zone Z1 based on the driving environment data ENV. Therefore, it is possible to compensate degradation of the convenience of the user U1 who suffers a disadvantage due to the resetting of the zone Z1.

What is claimed is:

1. A controller for a ride-sharing vehicle, the controller comprising:
a memory that stores drop-off data regarding a first user who gets off the ride-sharing vehicle and pick-up data regarding a second user who gets on the ride-sharing vehicle, the drop-off data including data of a first scheduled position where drop-off is performed, and the pick-up data including data of a second scheduled position where pick-up is performed; and
a processor configured to execute vehicle control including at least one of the drop-off of the first user and the pick-up of the second user based on at least one of the drop-off data and the pick-up data, wherein
the vehicle control includes
executing at least one of first zone setting processing and second zone setting processing based on at least one of the first scheduled position and the second scheduled position, the first zone setting processing being processing of setting a first zone where the drop-off is executed, on a road in front of the ride-sharing vehicle, and the second zone setting processing being processing of setting a second zone where the pick-up is executed, on the road in front of the ride-sharing vehicle,
determining whether or not the first zone and the second zone overlap when both the first zone setting processing and the second zone setting processing are executed,
setting, when determination is made that the first zone and the second zone do not overlap, a first target stop position of the ride-sharing vehicle within the first zone and setting a second target stop position of the ride-sharing vehicle within the second zone,
setting, when determination is made that the first zone and the second zone overlap, the second target stop position within the second zone, executing first zone resetting processing of resetting the first zone in a space not overlapping the second zone, and setting the first target stop position within the reset first zone, and
generating a target track based on the first target stop position or the second target stop position of the ride-sharing vehicle, and performing control of a traveling device of the ride-sharing vehicle to automatically move the ride-sharing vehicle along the target track, wherein the processor is configured to execute the second zone setting processing when a second distance between a current position of the ride-sharing vehicle and the second scheduled position is shorter than a second threshold value; and
the second zone setting processing includes
setting, when there is a plurality of the second scheduled positions each having the second distance shorter than the second threshold value, a candidate of the second zone for each of the second scheduled positions,
determining whether or not the candidates of the second zone include a nearest second zone candidate having the second distance that is shortest and a second alternative candidate that is another candidate overlapping the nearest second zone candidate,
setting the nearest second zone candidate as the second zone when determination is made that the candidates of the second zone include the nearest second zone candidate alone, and
combining, when determination is made that the candidates of the second zone include the nearest second zone candidate and the second alternative candidate, the nearest second zone candidate and the second alternative candidate to set the second zone.

2. The controller according to claim 1, wherein:
the drop-off data includes data of an attribute of the first user;
the processor is configured to execute the first zone setting processing when a first distance between a current position of the ride-sharing vehicle and the first scheduled position is shorter than a first threshold value; and
the first zone setting processing includes
setting, when there is a plurality of the first scheduled positions each having the first distance shorter than the first threshold value, a candidate of the first zone for each of the first scheduled positions,
determining whether or not the candidates of the first zone include a nearest first zone candidate having the first distance that is shortest and a first alternative candidate that is another candidate overlapping the nearest first zone candidate,
setting the nearest first zone candidate as the first zone when determination is made that the candidates of the first zone include the nearest first zone candidate alone, and
setting, when determination is made that the candidates of the first zone include the nearest first zone candidate and the first alternative candidate, the first zone based on the data of the attribute included in the same drop-off data as the data of the first scheduled position used in the setting of the nearest first zone candidate and the first alternative candidate.

3. The controller according to claim 2, wherein:
the ride-sharing vehicle includes a slope board configured to help drop-off of a vulnerable pedestrian;
the attribute includes classifications of the vulnerable pedestrian; and
the first zone setting processing includes
determining, when determination is made that the candidates of the first zone include the nearest first zone candidate and the first alternative candidate, whether or not the data of the attribute included in the same drop-off data as the data of the first scheduled position used in the setting of the nearest first zone candidate and the first alternative candidate includes data of the vulnerable pedestrian, and setting the first zone in a space where the slope board is expandable when determination is made that the data of the attribute includes the data of the vulnerable pedestrian.

4. The controller according to claim 3, wherein:
the attribute further includes classifications of a quasi-vulnerable pedestrian; and
the first zone setting processing includes
determining whether or not the data of the attribute includes data of the quasi-vulnerable pedestrian when determination is made that the data of the attribute does not include the data of the vulnerable pedestrian, and
setting the first zone in at least a flat space when determination is made that the data of the attribute includes the data of the quasi-vulnerable pedestrian.

5. The controller according to claim 2, wherein the first zone resetting processing includes processing of resetting the first zone based on the data of the attribute included in the same drop-off data as the data of the first scheduled position used in the setting of the nearest first zone candidate or the first alternative candidate in the first zone setting processing.

6. The controller according to claim 5, wherein:
driving environment data of the ride-sharing vehicle is further stored in the memory;
the attribute includes classifications of a vulnerable pedestrian and a quasi-vulnerable pedestrian; and
the first zone resetting processing includes
determining whether or not the data of the attribute included in the same drop-off data as the data of the first scheduled position used in the setting of the nearest first zone candidate or the first alternative candidate in the setting processing of the first zone includes data of the vulnerable pedestrian or the quasi-vulnerable pedestrian, and
setting the first zone based on the driving environment data when determination is made that the data of the attribute does not include the data of the vulnerable pedestrian or the quasi-vulnerable pedestrian.

7. The controller according to claim 1, wherein the ride-sharing vehicle includes a slope board configured to drop-off a vulnerable pedestrian, the slope board comprising an actuator that is configured to perform expansion and storage control of the slope board based on a control signal from the controller.

8. The controller according to claim 7, wherein when the first zone is set based on the first scheduled position, at least one condition is satisfied where the first zone comprises the space where the slope board is expandable, and the space comprises a flat space.

9. A control method by a controller for a ride-sharing vehicle, the controller including a memory and a processor, the memory storing drop-off data regarding a first user who gets off the ride-sharing vehicle and pick-up data regarding a second user who gets on the ride-sharing vehicle, the drop-off data including data of a first scheduled position where drop-off is performed, the pick-up data including data of a second scheduled position where pick-up is performed, and the processor being configured to execute vehicle control including at least one of the drop-off of the first user and the pick-up of the second user based on at least one of the drop-off data and the pick-up data, the control method comprising:
setting at least one of a first zone where the drop-off is executed and a second zone where the pick-up is executed, on a road in front of the ride-sharing vehicle based on at least one of the first scheduled position and the second scheduled position;
determining whether or not the first zone and the second zone overlap when both the first zone and the second zone are set;
setting, when determination is made that the first zone and the second zone do not overlap, a first target stop position of the ride-sharing vehicle within the first zone and setting a second target stop position of the ride-sharing vehicle within the second zone;
setting, when determination is made that the first zone and the second zone overlap, the second target stop position within the second zone, resetting the first zone in a space not overlapping the second zone and setting the first target stop position within the reset first zone; and
generating a target track based on the first target stop position or the second target stop position of the ride-sharing vehicle, and performing control of a traveling device of the ride-sharing vehicle to automatically move the ride-sharing vehicle along the target track,
wherein the processor is configured to set the second zone when a second distance between a current position of the ride-sharing vehicle and the second scheduled position is shorter than a second threshold value; and
setting the second zone includes
setting, when there is a plurality of the second scheduled positions each having the second distance shorter than the second threshold value, a candidate of the second zone for each of the second scheduled positions,
determining whether or not the candidates of the second zone include a nearest second zone candidate having the second distance that is shortest and a second alternative candidate that is another candidate overlapping the nearest second zone candidate,
setting the nearest second zone candidate as the second zone when determination is made that the candidates of the second zone include the nearest second zone candidate alone, and
combining, when determination is made that the candidates of the second zone include the nearest second zone candidate and the second alternative candidate, the nearest second zone candidate and the second alternative candidate to set the second zone.

10. The control method according to claim 9, wherein the ride-sharing vehicle includes a slope board configured to drop-off a vulnerable pedestrian, the slope board comprising an actuator that is configured to perform expansion and storage control of the slope board based on a control signal from the controller.

11. The control method according to claim 10, wherein when the first zone is set based on the first scheduled position, at least one condition is satisfied where the first zone comprises the space where the slope board is expandable, and the space comprises a flat space.

* * * * *